United States Patent
Malina et al.

(10) Patent No.: US 11,373,682 B2
(45) Date of Patent: Jun. 28, 2022

(54) DATA STORAGE DEVICE READING DATA FROM MAGNETIC TAPE IN FORWARD AND REVERSE DIRECTION

(71) Applicant: Western Digital Technologies, Inc., San Jose, CA (US)

(72) Inventors: James N. Malina, Irvine, CA (US); Weldon M. Hanson, Rochester, MN (US); Derrick E. Burton, Ladera Ranch, CA (US)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 0 days.

(21) Appl. No.: 17/177,715

(22) Filed: Feb. 17, 2021

(65) Prior Publication Data

US 2022/0068308 A1 Mar. 3, 2022

Related U.S. Application Data

(60) Provisional application No. 63/071,007, filed on Aug. 27, 2020.

(51) Int. Cl.
*G11B 20/12* (2006.01)
*G11B 27/029* (2006.01)
*G11B 27/30* (2006.01)

(52) U.S. Cl.
CPC ........ *G11B 20/1201* (2013.01); *G11B 27/029* (2013.01); *G11B 27/3027* (2013.01); *G11B 2220/90* (2013.01)

(58) Field of Classification Search
None
See application file for complete search history.

(56) References Cited

U.S. PATENT DOCUMENTS

| | | | |
|---|---|---|---|
| 3,356,996 A | 12/1967 | Niquette | |
| 4,870,645 A | 9/1989 | Herron | |
| 5,172,381 A | 12/1992 | Karp et al. | |
| 5,844,911 A * | 12/1998 | Schadegg | G11B 20/1883 714/710 |
| 5,844,920 A * | 12/1998 | Zook | G11B 5/012 714/769 |
| 6,009,549 A | 12/1999 | Bliss et al. | |
| 6,108,152 A | 8/2000 | Du et al. | |
| 6,118,605 A | 9/2000 | Call et al. | |
| 6,530,060 B1 * | 3/2003 | Vis | G11B 20/10009 714/792 |
| 6,608,730 B1 | 8/2003 | Gill | |
| 6,785,076 B1 | 8/2004 | Alva | |
| 7,006,316 B1 * | 2/2006 | Sargenti, Jr. | G11B 5/455 360/51 |
| 11,107,494 B1 * | 8/2021 | Sakagami | G11B 5/5513 |
| 2005/0264907 A1 * | 12/2005 | Dati | G11B 27/3027 360/48 |

(Continued)

*Primary Examiner* — Tan X Dinh
(74) *Attorney, Agent, or Firm* — Patterson + Sheridan, LLP; Steven H. VerSteeg

(57) ABSTRACT

A data storage device is disclosed comprising at least one head configured to access a magnetic tape. The head is used to write contiguously to the magnetic tape a first preamble, followed by a first sync mark, followed by symbols of a first data sector, followed by a second sync mark, followed by a second preamble, followed by a third sync mark, followed by symbols of a second data sector.

22 Claims, 3 Drawing Sheets

(56) References Cited

U.S. PATENT DOCUMENTS

| | | | |
|---|---|---|---|
| 2006/0171053 A1* | 8/2006 | Sai | G11B 20/10 |
| | | | 360/55 |
| 2009/0185305 A1* | 7/2009 | Cho | G11B 5/59638 |
| | | | 360/31 |
| 2010/0123969 A1* | 5/2010 | Urata | G11B 27/3027 |
| | | | 360/75 |
| 2010/0165497 A1* | 7/2010 | Wakisaka | G11B 20/18 |
| | | | 360/31 |
| 2011/0205657 A1* | 8/2011 | Cherubini | G11B 5/584 |
| | | | 360/51 |

* cited by examiner

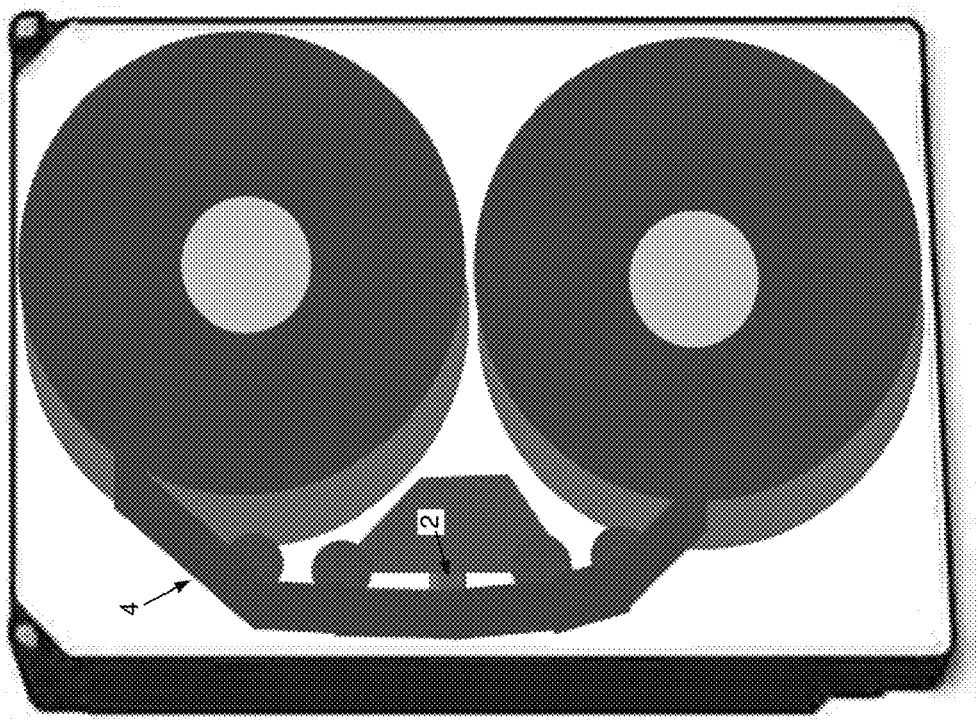
FIG. 1A
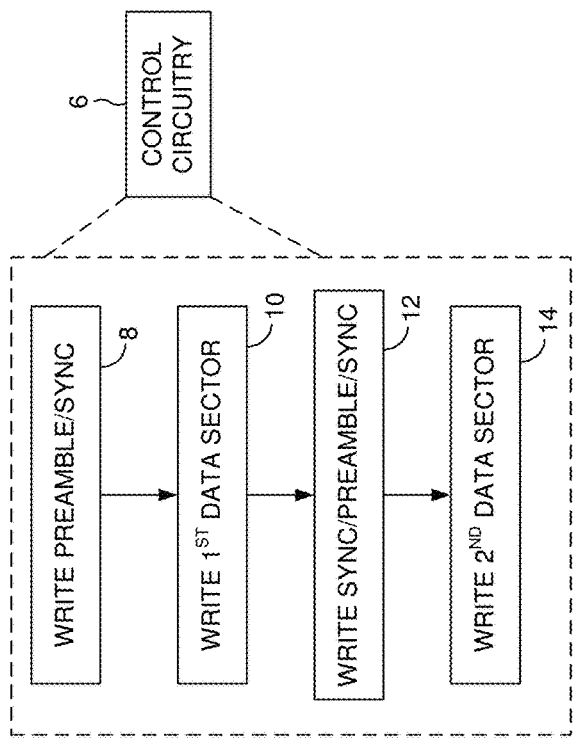
FIG. 1B
FIG. 1C
FIG. 1D

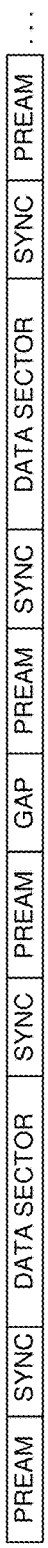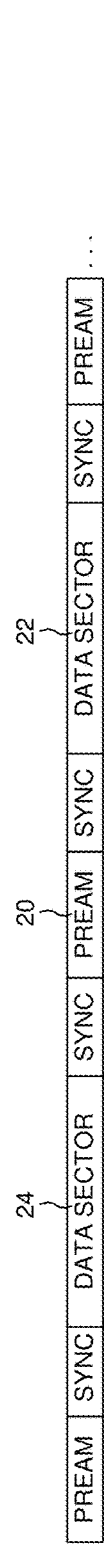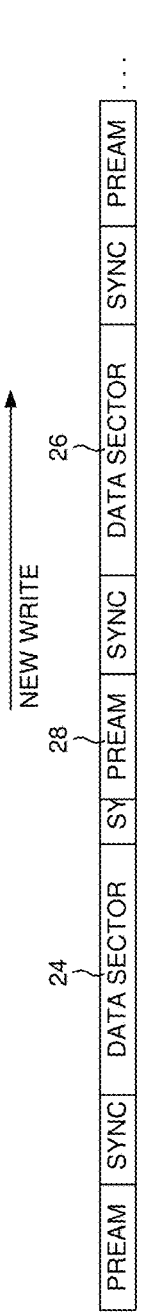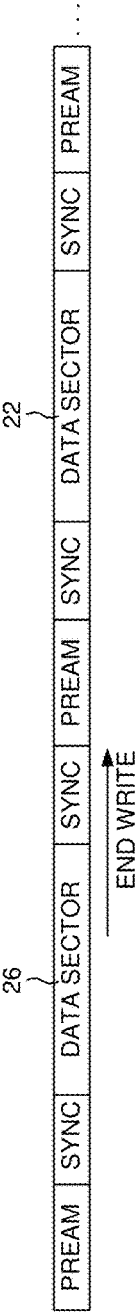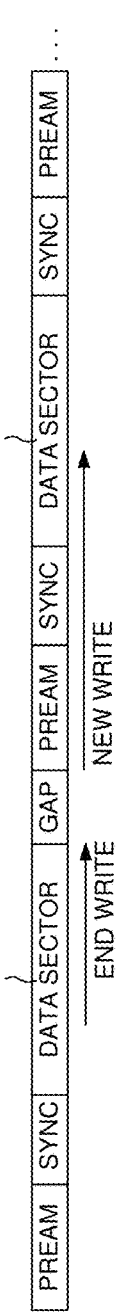
FIG. 2 (Prior Art)
FIG. 3A
FIG. 3B
FIG. 3C
FIG. 3D
FIG. 3E

DATA STORAGE DEVICE READING DATA FROM MAGNETIC TAPE IN FORWARD AND REVERSE DIRECTION

CROSS REFERENCE TO RELATED APPLICATIONS

This application claims priority to U.S. Provisional Patent Application Ser. No. 63/071,007, filed on Aug. 27, 2020, which is hereby incorporated by reference in its entirety.

BACKGROUND

Conventional tape drive storage systems comprise a magnetic tape wound around a dual reel (reel-to-reel cartridge) or a single reel (endless tape cartridge), wherein the reel(s) are rotated in order to move the magnetic tape over one or more transducer heads during write/read operations. The format of the magnetic tape may be single track or multiple tracks that are defined linearly, diagonally, or arcuate with respect to the longitudinal dimension along the length of the tape. With a linear track format, the heads may remain stationary relative to the longitudinal dimension of the tape, but may be actuated in a lateral dimension across the width of the tape as the tape moves past the heads. With a diagonal or arcuate track format, the heads may be mounted on a rotating drum such that during access operations both the heads and tape are moved relative to one another (typically in opposite directions along the longitudinal dimension of the tape).

BRIEF DESCRIPTION OF THE DRAWINGS

FIG. 1A shows a data storage device according to an embodiment comprising at least one head configured to access a magnetic tape.

FIG. 1B is a flow diagram according to an embodiment wherein at least two data sectors are written contiguously including an intervening preamble that may be used to sync to a first data sector in a reverse direction or to a second data sector in a forward direction.

FIG. 1C shows a data track format according to an embodiment wherein a sync mark is used to synchronize to the symbols of a data sector.

FIG. 1D shows a data track format wherein data sectors are written contiguously by writing a sync/preamble/sync sequence between the data sectors to facilitate forward and reverse reading.

FIG. 2 shows a prior art data track format wherein a sync/preamble/gap/preamble/sync sequence is written between the data sectors.

FIG. 3A shows a data track format according to an embodiment wherein a sync/preamble/sync sequence is written between the data sectors which improves format efficiency.

FIG. 3B shows a data track format according to an embodiment wherein an old data sector is overwritten with a new data sector by splicing into the sync/preamble/sync sequence of the old data sector.

FIG. 3C shows a data track format according to an embodiment wherein an old data sector is overwritten with a new data sector by overwriting at least part of the ending sync mark of the preceding data sector.

FIG. 3D shows a data track format according to an embodiment wherein a write operation is terminated by splicing into the sync/preamble/sync sequence of the following data sector.

FIG. 3E shows a data track format according to an embodiment wherein a write operation is terminated by leaving a gap instead of writing an ending sync mark.

DETAILED DESCRIPTION

Figure 1E:
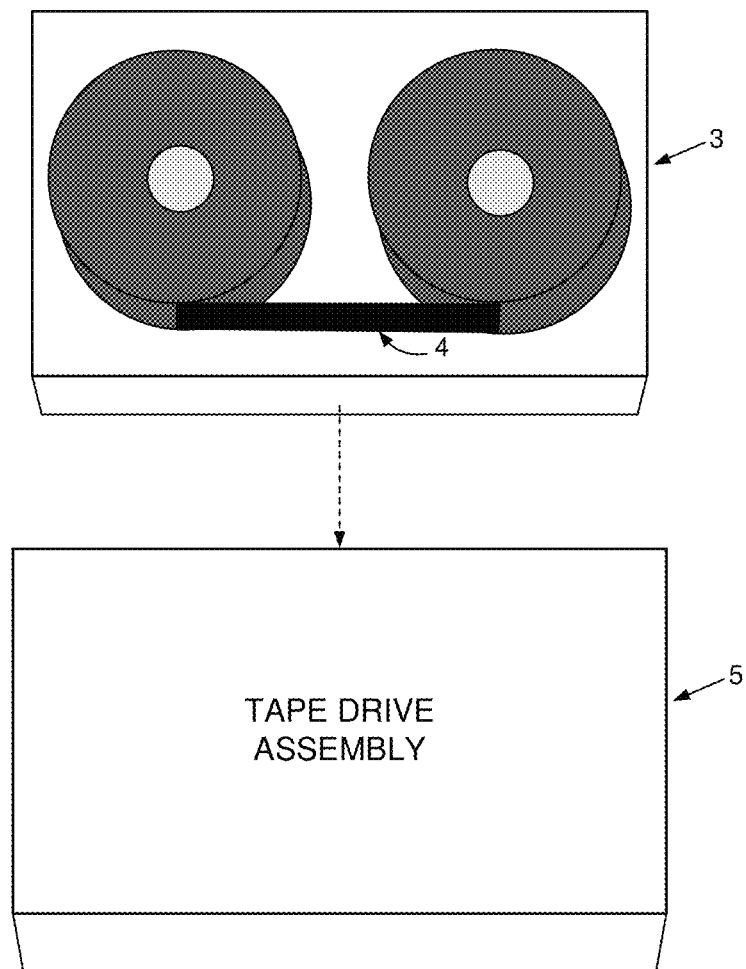
FIG. 1E shows a data storage device comprising a cartridge assembly comprising a magnetic tape, and a tape drive assembly configured to access the magnetic tape.

FIGS. 1A and 1B show a data storage device according to an embodiment comprising at least one head 2 configured to access a magnetic tape 4. The data storage device further comprises control circuitry 6 configured to execute the flow diagram of FIG. 1B, wherein the head is used to write contiguously a first preamble, followed by a first sync mark are written (block 8), followed by symbols of a first data sector (block 10), followed by a second sync mark, followed by a second preamble, followed by a third sync mark (block 12), followed by symbols of a second data sector (block 14).

In the embodiment of FIG. 1A, the data storage device comprises an embedded magnetic tape 4 installed into a tape drive assembly which, in one embodiment, may be the same form factor as a conventional disk drive. In another embodiment shown in FIG. 1E, the magnetic tape 4 may be housed in a cartridge assembly 3 that is inserted into (and ejected from) a tape drive assembly 5 similar to a conventional tape drive manufactured under the Linear Tape-Open (LTO) standard. In one embodiment, the tape drive assembly 5 comprises the head 2 configured to access the magnetic tape 4, and the control circuitry 6 configured to execute the flow diagram of FIG. 1B.

FIG. 1C shows a data track format according to an embodiment wherein when writing a data sector, a preamble 16 is written by writing a predetermined number of magnetic transitions at any suitable frequency which facilitates synchronizing timing recovery when reading the data sector. A sync mark 18 is written following the preamble 16, wherein the sync mark 18 is used to synchronize to the symbols of the data sector when reading the data sector. The sync mark 18 may consist of any suitable pattern, wherein in one embodiment the sync mark 18 consists of a pattern that maximizes the probability of accurate detection relative to the preamble and the first symbol of the data sector. In one embodiment, each symbol of the data sector represents a symbol of an error correction code (ECC) codeword, such as a low density parity check (LDPC) codeword.

FIG. 1D shows a data track format wherein each data sector is written with a beginning sync mark 18A used to symbol synchronize to the data sector while reading the data sector in a forward direction, and an ending sync mark 18B used to symbol synchronize to the data sector while reading the data sector in a reverse direction. In one embodiment, the beginning sync mark 18A and the ending sync mark 18B may consist of the same pattern, or in alternative embodiment the sync marks may consist of different patterns relative to one another.

FIG. 2 shows a prior art data track format wherein a:
sync/preamble/gap/preamble/sync
sequence is written between the data sectors. That is, each data sector is written with a beginning and ending sync mark to facilitate synchronizing to the data sector while reading in the forward or reverse direction. However, the prior art data track format of FIG. 2 is inefficient for at least two reasons: first, each data sector is written with a beginning and ending preamble field; and second, there is a gap left between the data sectors. In contrast, FIG. 3A shows an embodiment of a data track wherein a:

sync/preamble/sync sequence is written between the data sectors without leaving a gap between the data sectors (i.e., the data sectors are written contiguously). This data track format improves the format efficiency as compared to the prior art format of FIG. 2 by obviating the gap field as well as obviating the extra preamble field. Because the data sectors are written contiguously, the preamble 20 in the example of FIG. 3A may be used to synchronize timing recovery when reading data sector 22 in the forward direction, or when reading data sector 24 in the reverse direction. That is, a single preamble may be used to synchronize timing recovery for two data sectors instead of having a dedicated beginning/ending preamble for each data sector as in the prior art data track format of FIG. 2.

In one embodiment, it may be desirable to overwrite a previously written data sector (or data sectors) by splicing into a sequence of data sectors that were written contiguously as in the data track format of FIG. 3A. In an embodiment shown in FIG. 3B, the previously written data sector 22 of FIG. 3A is overwritten by a new data sector 26 by overwriting at least part of preamble 20 with a new preamble 28 (followed by the beginning sync mark for the new data sector 26). That is, the new data sector is "splice" written so that the new preamble 28 may be used to symbol synchronize the new data sector 26 during a forward read as well as symbol synchronize to the preceding data sector 24 during a reverse read. In one embodiment, writing the new preamble 28 may result in a discontinuity between the new preamble and the ending sync mark of the preceding data sector 24. This discontinuity may result in a small frequency and/or phase shift in the read signal when reading the preamble 28 and the ending sync mark during a reverse read of the data sector 24. In one embodiment, the small frequency and/or phase shift in the read signal may be compensated in any suitable manner, for example, by employing a suitable interpolated timing recovery configured to search for the correct sampling frequency and/or phase when attempting to detect the ending sync mark of the data sector 24. For example, in one embodiment the read signal samples of at least the ending sync mark may be buffered and then processed iteratively using an interpolated timing recovery which incrementally adjusts the sampling frequency and/or phase of the read signal samples until the ending sync mark is successfully detected.

In another embodiment shown in FIG. 3C, when overwriting the previously written data sector 22 of FIG. 3A the preamble 28 may overwrite at least part of the ending sync mark of the preceding data sector 24. In this embodiment, the ending sync mark of the preceding data sector 24 is converted into a gap field which helps ensure the preamble 28 of data sector 26 does not overwrite the end of the data sector 24 due to timing recovery error. In this embodiment, converting the ending sync mark of data sector 24 into a gap field means the ending sync mark may no longer be available to synchronize to the data sector 24 during a reverse read. In one embodiment, when the ending sync mark of data sector 24 becomes undetectable, other techniques may still be employed to read the data sector 24 in the reverse direction, such as by using an intermediate sync mark recorded within the data sector 24 (and erasing the intervening symbols), or performing reverse synchronization from an intervening or even the beginning sync mark of data sector 24.

FIG. 3D shows an embodiment wherein the end of a newly written data sector 26 may be spliced together with the preamble of a previously written following data sector. In this embodiment, the ending sync mark of the new data sector 26 may overwrite the ending sync mark of an old data sector 24. Similar to the embodiment described above, splicing the ending sync mark of data sector 26 with a previously written preamble may result in a discontinuity in the sampling frequency and/or phase when reading the data sector 26 in the reverse direction. As described above, the discontinuity may be compensated by synchronizing the buffered read signal samples using interpolated timing recovery.

In one embodiment, timing recovery error may prevent the accurate splicing of the ending sync mark of a newly written data sector 26 with the previously written preamble as shown in FIG. 3D. For example, a timing recovery error may cause the ending sync mark to be written late, thereby overwriting at least part of the previously written preamble leading to synchronization failure for both data sectors. Accordingly in one embodiment shown in FIG. 3E, instead of writing an ending sync mark a gap may be left between the end of the newly written data sector 26 and the previously written data sector 24 to ensure the previously written preamble is not overwritten. In one embodiment, the gap shown in FIG. 3E may also facilitate overwriting data sector 22 by preventing an early write (due to timing recovery error) from overwriting the end part of previously written data sector 26. That is, the gap enables a certain degree of timing recovery jitter without overwriting part of a previously written data sector. In one embodiment, when an ending sync mark is not written at the end of a write operation, the data sector may still be synchronized when reading in the reverse direction using the techniques described above, such as by using an intermediate sync mark recorded within the data sector (and erasing the intervening symbols), or performing reverse synchronization from an intervening or even the beginning sync mark of the data sector.

Any suitable control circuitry may be employed to implement the flow diagrams in the above embodiments, such as any suitable integrated circuit or circuits. For example, the control circuitry may be implemented within a read channel integrated circuit, or in a component separate from the read channel, such as a data storage controller, or certain operations described above may be performed by a read channel and others by a data storage controller. In one embodiment, the read channel and data storage controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or data storage controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In yet another embodiment, the control circuitry comprises suitable logic circuitry, such as state machine circuitry. In some embodiments, at least some of the flow diagram blocks may be implemented using analog circuitry (e.g., analog comparators, timers, etc.), and in other embodiments at least some of the blocks may be implemented using digital circuitry or a combination of analog/digital circuitry.

In addition, any suitable electronic device, such as computing devices, data server devices, media content storage devices, etc. may comprise the storage media and/or control circuitry as described above.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the embodiments disclosed herein.

What is claimed is:

1. A data storage device configured to access a magnetic tape, the data storage device comprising:
    at least one head configured to access the magnetic tape; and
    control circuitry configured to use the head to write contiguously to the magnetic tape a first preamble, followed by a first sync mark, followed by symbols of a first data sector, followed by a second sync mark, followed by a second preamble, followed by a third sync mark, followed by symbols of a second data sector.

2. The data storage device as recited in claim 1, wherein the data storage device comprises the magnetic tape.

3. The data storage device as recited in claim 1, wherein:
    the magnetic tape is housed in a cartridge assembly; and
    the data storage device comprises a tape drive assembly configured to receive the cartridge assembly.

4. The data storage device as recited in claim 1, wherein the control circuitry is further configured to:
    read the magnetic tape in a forward direction by reading the first sync mark in order to synchronize to the symbols of the first data sector; and
    read the magnetic tape in a reverse direction by reading the second sync mark in order to synchronize to the symbols of the first data sector.

5. The data storage device as recited in claim 1, wherein the control circuitry is further configured to overwrite the second data sector with a third data sector by:
    overwriting at least part of the second preamble with a third preamble;
    overwriting at least part of the third sync mark with a fourth sync mark; and
    overwriting at least part of the symbols of the second data sector with symbols of the third data sector.

6. The data storage device as recited in claim 5, wherein the control circuitry is further configured to read the magnetic tape in a reverse direction by reading the third preamble and the second sync mark in order to synchronize to the symbols of the first data sector.

7. The data storage device as recited in claim 1, wherein the control circuitry is further configured to overwrite the second data sector with a third data sector by overwriting at least part of the second sync mark with a third preamble used to synchronize timing recovery when reading the third data sector.

8. The data storage device as recited in claim 1, wherein the control circuitry is further configured to overwrite the first data sector with a third data sector by overwriting at least part of the second sync mark with a third sync mark used to synchronize to symbols of the third data sector when reading the third data sector in a reverse direction.

9. The data storage device as recited in claim 8, wherein the control circuitry is further configured to read the third data sector in the reverse direction by reading the second preamble in order to synchronize timing recovery.

10. The data storage device as recited in claim 1, wherein the control circuitry is further configured to overwrite the first data sector with a third data sector by converting at least part of the second sync mark into a gap field separating an end of the third data sector from the second preamble.

11. A data storage device configured to access a magnetic tape, the data storage device comprising:
    at least one head configured to access the magnetic tape; and
    control circuitry configured to:
        use the head to continuously write a plurality of data sectors to the magnetic tape without leaving a gap between each data sector; and
        use the head to write contiguously to the magnetic tape a first preamble, followed by a first sync mark, followed by symbols of a first data sector, followed by a second sync mark, followed by a second preamble, followed by a third sync mark, followed by symbols of a second data sector.

12. The data storage device as recited in claim 11, wherein the data storage device comprises the magnetic tape.

13. The data storage device as recited in claim 11, wherein:
    the magnetic tape is housed in a cartridge assembly; and
    the data storage device comprises a tape drive assembly configured to receive the cartridge assembly.

14. The data storage device as recited in claim 11, wherein the control circuitry is further configured to:
    read the magnetic tape in a forward direction by reading the first sync mark in order to synchronize to the symbols of the first data sector; and
    read the magnetic tape in a reverse direction by reading the second sync mark in order to synchronize to the symbols of the first data sector.

15. The data storage device as recited in claim 11, wherein the control circuitry is further configured to overwrite the second data sector with a third data sector by:
    overwriting at least part of the second preamble with a third preamble;

overwriting at least part of the third sync mark with a fourth sync mark; and overwriting at least part of the symbols of the second data sector with symbols of the third data sector.

16. The data storage device as recited in claim 15, wherein the control circuitry is further configured to read the magnetic tape in a reverse direction by reading the third preamble and the second sync mark in order to synchronize to the symbols of the first data sector.

17. The data storage device as recited in claim 11, wherein the control circuitry is further configured to overwrite the second data sector with a third data sector by overwriting at least part of the second sync mark with a third preamble used to synchronize timing recovery when reading the third data sector.

18. The data storage device as recited in claim 11, wherein the control circuitry is further configured to overwrite the first data sector with a third data sector by overwriting at least part of the second sync mark with a third sync mark used to synchronize to symbols of the third data sector when reading the third data sector in a reverse direction.

19. The data storage device as recited in claim 18, wherein the control circuitry is further configured to read the third data sector in the reverse direction by reading the second preamble in order to synchronize timing recovery.

20. The data storage device as recited in claim 11, wherein the control circuitry is further configured to overwrite the first data sector with a third data sector by converting at least part of the second sync mark into a gap field separating an end of the third data sector from the second preamble.

21. A data storage device comprising:
a magnetic tape;
at least one head configured to access the magnetic tape; and
a means for using the head to continuously write a plurality of data sectors to the magnetic tape without leaving a gap between each data sector, wherein the means for using the head to continuously write comprises a means for contiguously writing a first preamble, followed by a first sync mark, followed by symbols of a first data sector, followed by a second sync mark, followed by a second preamble, followed by a third sync mark, followed by symbols of a second data sector.

22. The data storage device as recited in claim 21, further comprising:
a means for reading the magnetic tape in a forward direction by reading the first sync mark in order to synchronize to the symbols of the first data sector; and
a means for reading the magnetic tape in a reverse direction by reading the second sync mark in order to synchronize to the symbols of the first data sector.

* * * * *